US006993982B2

(12) United States Patent
Karasawa et al.

(10) Patent No.: US 6,993,982 B2
(45) Date of Patent: Feb. 7, 2006

(54) STRESS SENSOR FOR ELECTRONIC DEVICES

(75) Inventors: Fumiaki Karasawa, Nagano (JP); Etsuo Ooba, Nagano (JP); Hiroshi Yajima, Nagano (JP)

(73) Assignee: Elantech Devices Corporation, (TW)

( * ) Notice: Subject to any disclaimer, the term of this patent is extended or adjusted under 35 U.S.C. 154(b) by 0 days.

(21) Appl. No.: 10/466,921

(22) PCT Filed: Jan. 18, 2002

(86) PCT No.: PCT/JP02/00351

§ 371 (c)(1),
(2), (4) Date: Jul. 21, 2003

(87) PCT Pub. No.: WO02/057731

PCT Pub. Date: Jul. 25, 2002

(65) Prior Publication Data

US 2004/0123676 A1    Jul. 1, 2004

(30) Foreign Application Priority Data

| Jan. 22, 2001 | (JP) | ................... | 2001-013849 |
| Jan. 22, 2001 | (JP) | ................... | 2001-013850 |
| Feb. 9, 2001 | (JP) | ................... | 2001-033548 |
| Jun. 28, 2001 | (JP) | ................... | 2001-197339 |

(51) Int. Cl.
*G01N 9/24* (2006.01)

(52) U.S. Cl. ............................ 73/862.629

(58) Field of Classification Search ........... 73/862.629, 73/862.628, 862.627, 862.632, 795, 794, 73/789, 788, 768, 767, 763
See application file for complete search history.

(56) References Cited

U.S. PATENT DOCUMENTS

| 3,739,316 | A | * | 6/1973 | Tokubo ................... 338/128 |
| 4,246,565 | A | * | 1/1981 | Wiley et al. ............ 338/163 |
| 5,252,881 | A | * | 10/1993 | Muller et al. ............ 310/309 |
| 5,349,873 | A | | 9/1994 | Omura et al. |
| 5,760,675 | A | | 6/1998 | Lee et al. |
| 5,835,977 | A | * | 11/1998 | Kamentser et al. ...... 73/862.05 |
| 5,872,320 | A | * | 2/1999 | Kamentser et al. .... 73/862.044 |
| 6,137,475 | A | | 10/2000 | Ginn et al. |
| 6,359,613 | B1 | * | 3/2002 | Poole .................... 345/161 |

OTHER PUBLICATIONS

International Search Report—PCT/JP02/00351; ISA/JPO, completed Jan. 31, 2002.

* cited by examiner

*Primary Examiner*—Max Noori
(74) *Attorney, Agent, or Firm*—Harness, Dickey & Pierce, P.L.C.

(57) ABSTRACT

A stress sensor enduring against long-term use is provided. Accordingly, a substrate (4), which is used as both a sensor part (1) and a supporting part (2), functions as a stress sensor, in which the sensor part (1) has means for deforming a part thereof in response to a given stress and strain gauges (5) having a function for varying electric properties in response to the deformation, and in which the deforming part has a stress dispersing means (10).

19 Claims, 11 Drawing Sheets

TOP VIEW

SIDE VIEW (a)

(b)

STRESS SENSOR FOR ELECTRONIC DEVICES

TECHNICAL FIELD

The present invention relates to stress sensors which can be used, for example, for a pointing device for personal computers, or a multifunctional and multidirectional switch for various electronic devices.

BACKGROUND ART

A stress sensor has been disclosed in Japanese Unexamined Patent Application Publication No. 2000-267803, in which strain gauges 22 formed by film formation are disposed on a surface of a substrate 20, a post 30 is bonded to another surface of the substrate 20, and the direction and magnitude of a stress applied to the post 30 can be grasped from variation in property of the strain gauges 22 resulting from the application of the stress.

As shown in FIGS. 14(a) and 14(b), the structure comprises: four resistor elements functioning as the strain gauges 22 provided with trimming grooves 21, which are disposed on two lines, being along a surface of the substrate 20 and perpendicularly intersecting each other at the center of the surface of the substrate 20, at substantially the same distance from the center mentioned above; and the post 30 having a square bottom surface bonded so that the center of the bottom surface thereof substantially coincides with the center of the substrate 20 and that each side of an outline 30b of the post bottom surface faces each of the resistor elements 22. In addition, the trimming grooves 21 are formed at two positions of each of the resistor elements 22, the two positions being along each side of the outline 30b of the post bottom surface and provided at the rear side of the substrate 20 corresponding thereto.

In addition, the movement of the stress sensor is shown in FIG. 13(a) in which a stress is applied to the post 30 in an X direction (that is, an optional lateral direction) and in FIG. 13(b) in which a stress is applied to the post 30 in a Z direction (that is, a downward direction).

In the movement of the stress sensor described above, in both cases in which a stress is applied to the post 30 in an X axis or a Y axis direction as shown in FIG. 13(a) and in which a stress is applied to the post 30 in a Z axis direction as shown in FIG. 13(b), solder 32 fixed by a circuit board 31 fixes end portions of the substrate 20, and the stress primarily warps positions of the substrate 20 corresponding to the individual sides of the outline 30b of the post bottom surface. In addition, the structure is formed in which by the stress described above, the strain gauges 22 which are the resistor elements disposed at the positions described above are elongated or contracted.

However, in the case of the structure of the above conventional stress sensor, there has been a problem in that the sensitivity (output) in response to the stress applied to the post 30 is low. It has been believed that the reason for this is that since the stress applied to the post has not been designed to be concentrated on the strain gauges or the design thereof has not been made sufficiently, the stress is likely to be disperses widely over the substrate 20, and as a result, the applied stress has not been effectively used.

Accordingly, a first object that the present invention aims to achieve is to provide a stress sensor having high sensitivity.

In addition, as shown in FIGS. 13(a) and (b), when the operation is performed many times to elongate or contract the resistor elements 22, the elongation or contraction may exceeds the region of elastic deformation in some cases to cause plastic deformation. Due to this plastic deformation, the output resistance from the resistor element 22 in response to subsequent stress application becomes incorrect. The reason for this is that since the plastic deformation is a deformation in which reversibility is lost, the original shape cannot be recovered even when the stress is removed, and a stress resulting from the plastic deformation of the substrate 20 is always applied to the resistor elements disposed on the substrate 20 as described above.

In particular, as shown in FIG. 14(b), when the trimming grooves 21 of the resistor elements 22 are formed along the outline 30b of the post bottom surface, it may be naturally expected that the movement to elongate or contract the resistor elements 22 may cause movement to open and close the trimming grooves 21 as shown in FIGS. 13(a) and (b). In the case described above, it is not too much to say that the plastic deformation of the resistor elements 22 is facilitated. The reason for this is that the trimming groove 21 portions are liable to be plastic-deformed as compared to the other portions. This is because of very large energy which is applied to a resistor forming the resistor element 22 when the trimming grooves 21 are formed.

For example, in the case of laser trimming, the resistor is partly and instantaneously heated to a high temperature, so that the part of the resistor is removed by evaporation thereof. Since this removal process is performed concomitant with large and very rapid change in temperature, of course, cracks may be generated around the periphery of the trimming groove 21 in some cases. The cracks thus generated may widely extend by the movement to open and close the trimming groove 4. As a result, it is expected that the plastic deformation may occur from the cracks as starting sites.

Other trimming methods also partly excavate or damage the resistor forming the resistor element 22 as is the case of the laser trimming. When cracks are generated in the resistor by the reason as described above, a factor serving to embrittle the resistor is additionally generated. As the trimming methods other than laser trimming, for example, sand blasting may be mentioned.

Accordingly, a second object that the present invention aims to achieve is to provide a stress sensor which can achieve the first object and which can maintain the accuracy of output resistance by suppressing the plastic deformation of resistors which are used as strain gauges and form resistor elements provided with trimming grooves.

DISCLOSURE OF INVENTION

In order to achieve the first object described above, a stress sensor having a first structure of the present invention is a stress sensor in which strain gauges 8 are disposed on a surface of a substrate 1, a post 6 is disposed on one of surfaces of the substrate 1, and the direction and magnitude of a stress applied to the post 6 can be grasped from variation in property of the strain gauges 8 resulting from the application of the stress. In the stress sensor described above, the strain gauges 8 are disposed on and the post 6 is bonded to or integrated with the same surface of the substrate 1. As the strain gauges 8, for example, resistor elements 2 each formed of a thick or a thin film, or piezoelectric elements formed of PZT (lead zirconate titanate) may be preferably used.

In addition, in order to achieve the first object described above, a stress sensor having a second structure of the present invention is a stress sensor in which the strain gauges 8 are disposed on a surface of the substrate 1, the post 6 bonded to one of surfaces of the substrate 1, and the direction and magnitude of a stress applied to the post 6 can be grasped from variation in property of the strain gauges 8 resulting from the application of the stress. In the stress sensor described above, a post 6 bottom surface and a part or the entire area of each of the strain gauges 8 overlap each other without the substrate 1 provided therebetween.

In general, stress sensors each comprise a control unit in which the electrical properties described above are, for example, detected and computed, thereby functioning as a stress sensor. However, in this specification, for convenience, a portion excluding the control unit described above is referred to as a "stress sensor".

In addition, "the post 6 is bonded to a surface of the substrate 1" indicates the state in which the post 6 and the substrate 1 are different members and are fixed together with an adhesive or the like. In addition, "the post 6 is integrated with a surface of the substrate 1" indicates the state in which the post 6 and the substrate 1 are, for example, integrally formed. In this specification, when the "outline of the post bottom surface" is present in the latter case, the expression indicates a portion corresponding to that represented by the "outline of the post bottom surface" in the former case.

By the first structure described above, a stress sensor having high sensitivity to a stress applied to a Z direction can be provided as compared to that in the past. The reason for this will be described. For example, when the post 6 and the resistor elements 2 are mounted on the same surface of the substrate 1 as shown in FIG. 1(a), and a stress is applied to the post 6 in the Z direction, although the warpage of the substrate 1 obtained by the stress application is equal, between the warpage of a resistor element 2 disposed on the surface of the substrate 1 which is warped to form a concave shape and the warpage of a resistor element 2 disposed on the surface of the substrate 1 which is warped to form a convex shape, the warpage of the resistor element 2 disposed on the surface of the substrate 1 which is warped to form a convex shape is larger because of the difference in curvature radius of the surface. That is, the variation (output) in resistance of the resistor elements 2 caused by the stress application in the Z direction can be increased. This tendency is enhanced with increase in thickness of the substrate 1. Accordingly, the preferable thickness of the substrate 1 is 0.3 to 1.2 mm. When the thickness of the substrate 1 is less than 0.3 mm, it becomes difficult to obtain a significant difference in curvature radius. In addition, when the thickness of the substrate 1 is more than 1.2 mm, although depending on a material for the substrate 1, warping of the substrate 1 becomes unlikely to occur by the stress applied thereto, and adversely, it is believed that the variation (output) in resistance of the resistor elements 2, which is caused by the stress applied in the Z direction, becomes unlikely to be increased.

In addition, by the reason approximately equivalent to that capable of increasing the output in the Z direction, it is naturally understood that output in X and Y directions can also be increased.

In the stress sensor of the present invention, when some function is created (added) by using the stress application to the post 6 in a downward direction (z direction) as described above, multifunctionality can be enhanced. For example, when the stress sensor of the present invention is used as a pointing device of a computer, a so-called mouse-clicking function may be served by the stress application in the downward direction described above. In addition, for example, when the stress sensor of the present invention is used as a multidirectional switch of a compact mobile device such as a so-called mobile phone, stress application in the downward direction for a predetermined time may correspond to the instruction on ON and OFF operation of a power source of the mobile device.

Another advantage of the first structure in which the strain gauges 8 are disposed on and the post 6 is bonded to or integrated with the same surface of the substrate 1 is that the stress sensor of the present invention can be manufactured by performing mounting operation only on one side surface of the substrate 1 and that easier manufacturing can be performed thereby. The mounting operation mentioned above includes, for example, screen printing of the surface of the substrate 1 with conductors 5, resistors 3, and the like forming the resistor elements 2, and bonding of the post 6 to the surface of the substrate 1 with an adhesive or the like. On the other hand, in the case in which the mounting is performed on the two surfaces of the substrate 1, while the mounting is performed on one surface of the substrate 1, a position at which the other surface of the substrate 1 is placed must be controlled under strict conditions in terms of cleanness, softness, and the like. From this point of view, when the mounting is performed on the same surface of the substrate 1, the strict conditions as described above is not required.

Another advantage obtained in the case in which the strain gauges 8 are disposed on and the post 6 is bonded to or integrated with the same surface of the substrate 1 is that the alignment of the strain gauges 8 and the post 6 can be easily performed. The positional relationship between the strain gauges 8 and the post 6 is a significantly important factor that determining the performance of the stress sensor. For example, in FIG. 2, when the position of the post 6 is largely deviated, the stress applied to the post 6 is propagated in a different manner to each of the strain gauges 8. The reason for this is that the positions on the outline 7 of the post bottom surface, at which the strain gauges 8 are warped, are deviated. In the case in which the post 6 and the resistor elements 2 are mounted on different surfaces of the substrate 1, when one surface of the substrate 1 is visually observed, the other surface of the substrate 1 cannot be observed. Hence, it has been difficult to understand the positional relationship between the post 6 and the resistor elements 2, and as a result, the positional deviation therebetween is relatively liable to occur. However, when both the post 6 and the strain gauges 8 are mounted on the same surface of the substrate 1, the relative positional relationship between the post 6 and the strain gauges 8 is very easily grasped, and hence the positional deviation described above is unlikely to occur. In addition, visual inspection can be easily performed when an element which is disposed once at a deviated position is removed.

According to the second structure in which the post 6 bottom surface and a part or the entire area of each of the strain gauges 8 overlap each other without the substrate 1 provided therebetween, a stress sensor having an improved sensitivity to the stress applied in the X and Y directions, in addition to the Z direction, can be provided. The reason for this is that the stress applied to the post 6 almost directly stimulates the resistor elements 2 without through the substrate 1. As the result of this stimulation, the strain gauges 8 are compressed. For example, in FIG. 1(b), one example is shown. In this figure, the structure is shown in which the strain gauges 8 (resistor elements 2) are disposed on the top surface of the substrate 1, and a part of each of the strain gauges 8 (resistors 3 portion) is disposed so as to overlap a post 6 bottom portion. By the stimulation described above, the resistors 3 are partly compressed, and as a result, the resistance thereof is increased.

In addition, of course, the second structure described above has the two advantages of the first structure described above. In addition, when a conventional stress sensor outputs a stress applied in the Z direction, it is necessary to provide a gap at a surface of the substrate 1, different from that on which the post 6 is disposed, so that the substrate 1 is warped in the Z direction; however, according to the second structure shown in FIG. 1(b), an advantage can be obtained in that the gap described above is not always necessary. However, it is preferable when the gap described above is provided since the sensitivity to the stress applied in the Z direction can be further improved.

An important function of the second structure is a function capable of grasping the direction and magnitude of an applied stress from variation in property of the strain gauges 8 caused by a pressure applied thereto and the removal thereof resulting from the application of the stress.

When the structure has the important function described above, it is not necessary to limit the positions at which the strain gauges 8 are disposed to the surface of the substrate 1. For example, in the structure shown in FIG. 1(b), the disposition may be made on the bottom surface of the post 6. In this case, it is believed that an advantage in that the stress sensor can be miniaturized on the whole is obtained. However, since a manufacturing method in which the disposition is made on a flat substrate 1 is easily performed as compared to a manufacturing method in which the strain gauges 8 are disposed on the bottom surface of the post 6, in recent years, it has been believed that the advantage of the second structure is more significant.

In addition, in order to achieve the first object of the present invention, a stress sensor having a fourth structure of the present invention is a stress sensor in which the direction and magnitude of a stress applied to the post 6 can be grasped from variation in resistance of the resistor elements 2, which are not provided with trimming grooves 4, caused by stimulation applied thereto resulting from the application of the stress. In the stress sensor described above, the stimulation is primarily applied to resistor 3 regions in which a current density is high.

In the fourth structure described above, the substrate 1 is not an essential factor. That is, the resistor elements 2 may be formed on a surface of the substrate 1 or may be formed, for example, on side surfaces of the post 6. That is, the structure may be used in which the resistor elements 2 are stimulated caused by the application of the stress to the post 6.

That is, the stimulation described above is, for example, elongation and contraction of the strain gauges 8 disposed on the substrate 1 caused by warping of the side surface of the post 6 or the substrate 1, shown in FIG. 1(a); a pressure applied to the strain gauges 8 and the removal thereof by the post 6 bottom surface without through the substrate 1, shown in FIG. 1(b); or elongation and contraction of the strain gauges 8 disposed at the side surfaces of the post 6 by using the warping of the post 6 itself, which are not shown in the figure.

In the resistor element 2, since a resistor 3 region having a narrow current pass is a region in which a current density is high, when this region is primarily stimulated, the variation in resistance, that is, the output of the stress sensor, can be increased as compared to the case in which another region is stimulated. Accordingly, by using the stress sensor having the fourth structure described above, a stress sensor capable of efficiently converting the stress applied to the post 6 into the variation in resistance can be provided, and hence the first object can be achieved. In addition, since a first stress sensor is not provided with the trimming grooves 4, of course, plastic deformation is unlikely to occur even when the resistors 3 are stimulated, and hence it may be said that the second object is achieved.

The state in which "the stimulation is primarily applied to the resistor 3 region having a narrowed current pass" means the state in which a maximum part of the distribution of the stress applied to the resistor 3 in the resistor 3 region is present in the resistor 3 region having the narrowed current pass.

In addition, in the resistor element 2, for positively forming the resistor 3 region having a narrowed current pass, for example, when a resistor patterning is performed, for example, by screen printing for forming a thick-film resistor, means for forming a resistor partly having a narrow width, when it is viewed from above the pattern, is effective. In addition, for example, means is also effective in which protruding convex portions are provided on parts of a surface of the substrate on which thick-film resistors are to be provided, a resistor paste used for screen printing is applied to flow from tops of the convex portions to a lower side, followed by treatment of stopping the flow of the resistor paste (firing, curing, or the like), so that thin resistor portions are formed at the convex portions. In addition, the former and the latter means may be used in combination.

A stress sensor having a fifth structure of the present invention, which achieve the second object, is a stress sensor in which the direction and magnitude of a stress applied to the post 6 can be grasped from variation in resistance of the resistor elements 2, which are provided with the trimming grooves 4, caused by stimulation applied to the resistor elements 2 resulting from the application of the stress. In the stress sensor described above, the stimulation described above does not substantially open and close the trimming grooves 4 and is primarily applied to the resistor 3 regions in which a current density is high.

The reason the fifth structure can achieve the first object is the same reason as that for a fourth stress sensor which can achieve the first object. In addition, the reason a fifth stress sensor can achieve the second object is that the stimulation does not substantially open and close the trimming grooves 4, and that plastic deformation of the resistors 3, starting from cracks around the trimming grooves 4, is unlikely to occur. In order to form a stress sensor having the structure in which the stimulation does not substantially open and close the trimming grooves 4, for example, in a stress sensor which moves in a manner as shown in FIG. 13, means for forming the positional relationship in which the outline 7 of the post bottom surface and the trimming grooves 4 perpendicularly intersect each other, as briefly shown in FIG. 2, may be mentioned. The reason the trimming grooves 4 are not substantially opened and closed by the structure described above is that the direction in which the resistor element 2 is stimulated (elongated and contracted) by warping of the substrate 1 approximately coincides with the direction in which the trimming grooves 4 are formed. Accordingly, even when the stress sensor is used many times, the resistors 3 are not liable to be plastic-deformed, and hence it may be said that the second object can be achieved.

In addition, as shown in FIG. 3, to locate the trimming grooves 4 only on a surface of the substrate 1 inside the outline 7 of the post bottom surface is effective for substantially suppressing the open and close of the trimming grooves 4. The reason for this is that the position of the substrate 1 to which the post 6 bottom surface is bonded is not substantially warped by the movement shown in FIG. 13, and that the stress is unlikely to be propagated to the resistors 3 through the position described above. By the same reason as described above, as shown in FIG. 2, to locate the trimming grooves 4 only on a surface of the substrate 1 outside the outline 7 of the post bottom surface is effective for substantially suppressing the open and close of the trimming grooves 4. The reason for this is that the part of the substrate 1 along the outline of the post bottom surface is most warped.

In addition, as shown in FIG. 2, to locate the trimming grooves 4 only on a surface of the substrate 1 outside the outline 7 of the post bottom surface is also effective for substantially suppressing the open and close of the trimming grooves 4. In a stress sensor having the structure in which the post 6 and the strain gauges 8 are disposed on surfaces of the substrate 1 opposite to each other, when trimming grooves 4 are present in resistor regions located only outside or inside the outline 7 of the post bottom surface, the trimming grooves 4 described above are formed at positions apart from those corresponding to the outline 7 of the post bottom surface, at which the largest deformation of the substrate 1 and the strain gauges 8 (resistor elements 2) occurs by the stress applied to the post 6. Hence, the stress applied to the trimming grooves 4 can be suppressed as small as possible, and as a result, the structure described above has an increased contribution to the achievement of the second object.

In the fifth structure shown in FIGS. 2 and 3, the resistor 3 regions in which the current passes are narrowed by the trimming grooves 4 are located outside the positions of the substrate 1 corresponding to the outline 7 of the post bottom surface at which the substrate 1 is warped by the stress applied to the post 6. Accordingly, the regions described above become regions in which the current density is highest, and since the regions are primarily stimulated (elongated and contracted), a stress sensor capable of efficiently converting the stress applied to the post 6 to the variation in resistance can be provided so as to contribute the achievement of the first object.

In the fourth and the fifth structures described above, for example, as shown in FIGS. 1(*a*) and (*b*), it is preferable that the resistor elements 2 be disposed on the same surface of the substrate 1 and that the post 6 be bonded to or integrated with the surface of the substrate 1. The reason for this, that is, the advantage is the same as the advantage obtained by the first to third stress sensors.

In addition, in order to achieve the first object, a stress sensor having a sixth structure is a stress sensor in which the resistor elements 2, provided with no trimming grooves 4, are disposed on a surface of the substrate 1, and in which the direction and magnitude of a stress applied to the post 6 can be grasped from variation in resistance of the resistor elements 2 caused by a pressure applied between the post 6 bottom surface and the surface of the substrate 1 and the removal thereof resulting from the application of the stress without through the substrate 1. In the stress sensor described above, the pressure is primarily applied to resistor regions in which a current density is high.

The sixth structure described above clearly shows that, in addition to the stimulation caused by the elongation and contraction of the resistor elements 2 resulting from the warping of the substrate 1, the pressure applied to the resistors 3 and the removal thereof are also effective in the present invention. The mechanism of a sixth stress sensor of the present invention for achieving the first object is approximately equivalent to that of the first and second stress sensors. In the case described above, as a member involved in the application of the pressure, the post 6, that is, a member to which a stress is applied, is advantageously used since the loss of the stress can be decreased, and accurate direction and magnitude of the stress can be propagated. In this case, the largest pressure is applied to resistor 3 regions which are in contact with or correspond to the outline 7 of post bottom surface.

In addition, it is expected that the sixth structure can achieve the second object of the present invention. The reason for this is that it is considered that, by the stimulation (pressure or removal thereof) to the resistors 3, the trimming grooves 4 may not be substantially opened and closed. In addition, in a stress sensor having the structure in which the trimming grooves 4 are not directly pressed and the resistor 3 portions other than the trimming grooves 4 are only stimulated, the structure described above, of course, achieves the second object of the present invention.

In the sixth structure, since the outline 7 of the post bottom surface, which applies the largest pressure to the resistors 3, is located in the resistor 3 regions in which the current pass is narrowed (for example, resistor 3 regions in which the current pass is narrowed by the trimming grooves 4), the structure described above contributes to the achievement of the first object of the present invention.

In addition, in order to achieve the first and the second objects, a stress sensor having a seventh structure of the present invention is a stress sensor provided with one of the first to the sixth structures. In the stress sensor described above, the four strain gauges 8 formed of the resistor elements 2 are disposes on two lines, perpendicularly intersecting each other at a center of a sensor effective region on a surface of the substrate 1, at substantially the same distance from the intersecting point; the post 6 is bonded or integrated so that the center of the sensor effective region on the surface of the substrate 1 substantially coincides with the center of the post 6 bottom surface; and the direction and magnitude of a stress applied to the post 6 can be grasped from variation in resistance caused by elongation and contraction of the resistor elements 2, or by a pressure applied thereto and the removal thereof, resulting from the stress applied to the post 6. In this case, the "center" of the above "center of the sensor effective region" and "center of the post 6 bottom surface" does not strictly mean the center point but it includes a shift from the center point, in which the stress sensor effectively functions.

As the description has made clear, the structure shown in FIG. 2 is the first structure and may also be the seventh structure. In addition, the state in which the structure shown in FIG. 2 is provided and, as shown in FIG. 1(*b*), the post 6 bottom surface overlaps a part or the entire surface of each of the strain gauges 8 without the substrate provided therebetween is also the seventh structure.

In addition, in order to achieve the first and the second objects, a stress sensor having an eighth structure of the present invention is a stress sensor in which one of the first to the seventh structures is provided, a post bottom portion 12 has projecting portions 15, and by a stress applied to the post 6, the projecting portions 15 of the post bottom portion 12 primarily stimulate the strain gauges 8 or the resistor elements 2.

By the eighth structure described above, a stress sensor having higher sensitivity to the stress applied to the post 6 can be provided, and the reason for that is as follows. The sensitivity described above can be improved by increasing an amount of elongation, contraction, or compression of the strain gauges 8 such as the resistor elements 2. Accordingly, as is the eighth structure described above, by providing the projecting portions 15 at the post bottom portion 12, the stress applied to the post 6 can be concentrated on the projecting portions 15. When the projecting portions 15 stimulate the strain gauges 8, the concentrated stress is propagated to the strain gauges 8, and as a result, the amount of elongation, contraction, or compression is increased as compared to that in the past.

In the past, the post bottom portion 12 also had the projecting portions 15. For example, in the post 30 shown in FIG. 14, the outer shape of the bottom surface is square, and the angular portions thereof correspond to the projecting portions 15 of the post bottom portion 12. However, the positions at which the angular portions are disposed do not correspond to the strain gauges 8, and as a result, the projecting portions 15 do not stimulate the strain gauges 8. Accordingly, most of the stress concentrated on the angular portions is not propagated to the strain gauges 8, and consequently, the amount of elongation, contraction, or compression of the strain gauges 8 is not increased.

In the eighth structure described above, in the case in which the post 6 and the strain gauges 8 are disposed on different surfaces of the substrate 1, when the substrate 1 is too thick, dispersion of the stress becomes excessively high, and as a result, the stress becomes unlikely to be propagated to the strain gauges 8. In addition, when the thickness of the substrate 1 is too thin, by repeated stress concentration, the shape of the substrate 1 becomes unlikely to be recovered. That is, the substrate 1 may be plastic-deformed by exceeding the region of elastic deformation in some cases. In consideration of the cases described above, the preferable thickness of the substrate 1 is in the range of from 0.5 to 0.8 mm. Although varying depending on a material for the substrate 1, the thickness is approximately in the range described above.

A particular example of the eighth structure and a preferable structure based thereon is the structure in which the outer shape of the post 6 bottom surface is a polygon as shown in FIG. 8, and in which the angular portions of the polygon serve as the projecting portions 15. The number of the angular portions of the polygon is preferably equivalent to that of the strain gauges 8. The reason for this is that when a polygon having angular potions larger than the number of the strain gauges 8 is used, the stress applied to the post 6 is likely to be concentrated on potions other than the strain gauges 8 (that is, the stress is likely to be dispersed), and as a result, the stress thus applied cannot be efficiently propagated to the strain gauges 8. In the structure shown in FIG. 8, as described above, the number of the strain gauges 8 is four, and the polygon is square.

In addition, in the eighth structure and the group of preferable structures based on these described above, it is preferable that the outer shape of the substrate 1 have at least one pair of sides which are parallel to each other, that a top portion of the post 6 be in the form of a polygonal pole having at least one pair of side surfaces which are parallel to each other, and that said pair of sides and said pair of side surfaces be parallel to each other. Those described above are realized by the post 6 shown in FIG. 8. That is, the top portion of the post 6 is a tall square pole and has a pair of facing side surfaces which are parallel to each other. In addition, the outer shape of the substrate 1 is square and has a pair of facing sides which are parallel to each other. In addition, when viewed from above, the sides forming the outer shape of the substrate 1 and the sides forming the outer shape of the top portion of the post 6, which are located at respective positions to the above sides, are all parallel to each other. Hence, the structure is formed in which said pair of sides and said pair of side surfaces are parallel to each other. By using the structure as described above, workability of bonding the post 6 to the substrate 1 may be improved in some cases. The reason for this is that a holding direction of a known mounting device which holds and moves a workpiece (the top portion of the post 6 when the post 6 is held) is not changed, and that the movement described above is performed only in optional x and y directions, that is, a movement in a θ direction, i.e., a rotational movement, is not performed. When the substrate 1 and the post 6 are mounted by a known mounting device while aligned, the workability is significantly improved in view of simplification. In the case described above, due to limited functions of a know mounting device, the structure in which said pair of sides of the substrate 1 and said pair of side surfaces of the post 6 are parallel to each other is required.

In addition, in the eighth structure and the group of preferable structures based on these described above, it is preferable that the projecting portion 15 have a round shape. The reason for this is that the first object of the present invention can be achieved even when the stress concentrated at the strain gauges 8 is dispersed to some extent, and it is believed that the round shape will not cause serious problems. In addition, when the stress concentration is dispersed to some extent by forming the round shape, as described above, the plastic deformation of the substrate 1 described above and the plastic deformation of the strain gauges 8 can also be suppressed. It is believed that the effect of the round shape is particularly advantageous in the state in which the post 6 bottom surface overlaps a part or the entire area of each of the strain gauges 8 without the substrate 1 provided therebetween. The reason for this is that the plastic deformation of the strain gauges 8 can be suppressed, the strain gauges 8 generally formed of a material which is softer than that for the substrate 1 and is likely to be plastic-deformed as compared thereto.

In all the structures of the present invention described above, a protection film directly covering at least the strain gauges 8 is more preferably formed. The protection film is preferably formed of a material softer than that for the substrate 1 and the strain gauges 8. As the material described above, in general, a silicone-based resin material, a rubber material, or the like may be mentioned. In the structure in which the post 6 bottom surface almost directly stimulates the strain gauges 8, such as the second structure described above, the soft material has an effect of dispersing the stress in a predetermined range (in general, approximately in the region of common strain gauges 8) to a proper extent when the stimulation is performed. Hence, the stress described above is not only transmitted to limited parts of the strain gauges 8 but is also sufficiently transmitted to the entire areas of the strain gauges 8, and as a result, the plastic deformation of the strain gauges 8 can be suppressed. In addition, in the structure shown in FIG. 1(a) of the present invention, the soft material has an effect of suppressing the decrease in adhesion between the substrate 1 and the strain gauges 8, which is caused by repeated warping of the strain gauges 8 following the warping of the substrate 1.

Among the soft materials, a silicone-based resin material is not liable to be degraded by repeated deformation, can maintain a high adhesive strength between the substrate 1 and the resistor elements 2, and can reliably protect the resistor elements 2 for a long period of time, and hence the silicone-based resin material is preferably used.

In all the structures of the present invention described above, the post 6 is preferably composed of a metal, a ceramic, a resin, or a fiber-reinforced resin. The advantage obtained when a metal, such as iron or high carbon steel, or a ceramic is used as a material for the post 6 is that a stress applied thereto can be accurately propagated because of the rigidity of those described above. In addition, a first advantage obtained when a resin or a fiber-reinforced resin is used as a material for the post 6 is that when the production thereof is performed, less energy is consumed. For example, a temperature for molding and curing a resin or a fiber-reinforced resin is very low as compared to a sintering temperature for a ceramic and a casting temperature for a metal. A second advantage is superior moldability to that of ceramic and metal. For example, when a post 6 having a complicated shape is formed, cracking may occur in ceramic during a molding or sintering step and in metal during a casting step in some cases. The reason for this is that, during cooling, the rigid material cannot follow the volume contraction thereof caused by a temperature change from a very high temperature to room temperature. On the contrary, when a resin of a fiber-reinforced resin is used, since a melting temperature of a resin is very low as compared to the sintering temperature and the casting temperature described above, the volume contraction during cooling is small, and in addition, the rigidity of a resin is low as compared to that of a metal or a ceramic, it is said that the problem described above may not occur at all.

This post 6 may be used when the stress sensor of the present invention is applied to a pointing device for a personal computer or a multifunctional and multidirectional switch for various electronic devices such as a mobile phone, in particular, a compact mobile electronic device. In the case in which the stress sensor of the present invention is used as the multifunctional and multidirectional switch described above, in order to enable an operator to recognize by feeling a direction in which a stress is to be applied, it is preferable that a cross-sectional shape of a side surface of the post 6 be polygonal so that each instruction can be transmitted to an electronic device by applying a stress perpendicularly to each flat surface on the side of the post 6. When the complication of forming the post 6 having the cross-sectional polygonal shape described above is taken into consideration, the post 6 is preferably formed of a resin or a fiber-reinforced resin as described above.

In addition, as a material when a resin is used, in particular, poly(vinyl terephthalate) (PVT) is preferably used. Since PVT has superior rigidity among resin materials, an advantage is obtained in that a stress applied can be relatively accurately propagated. In addition, since the heat stability is also superior, even when the use environment is at a temperature slightly higher than room temperature, an advantage in that the rigidity described above is maintained can also be obtained.

In addition, in the first to the eighth structures and preferable structures based thereon, it is preferable that the substrate 1 be primarily composed of a resin, a metal covered with a non-conductive material on the surface thereof, or a ceramic. As the material primarily composed of a resin, for example, a phenolic resin itself, or a fiber-reinforced resin such as a molded body made of a glass fiber filled epoxy resin may be mentioned. As the metal covered with a non-conductive material on the surface thereof, an iron or an aluminum plate coated with a polyethylene resin may be mentioned. As the ceramic mentioned above, for example, alumina may be used. In addition to flexibility to be warped to some extent, the substrate 1 must also have both rigidity and elasticity so as to be able to recover its own shape when a stress repeatedly applied thereto is removed, and all the materials described above by way of example can satisfy the above requirements.

Figure 1:
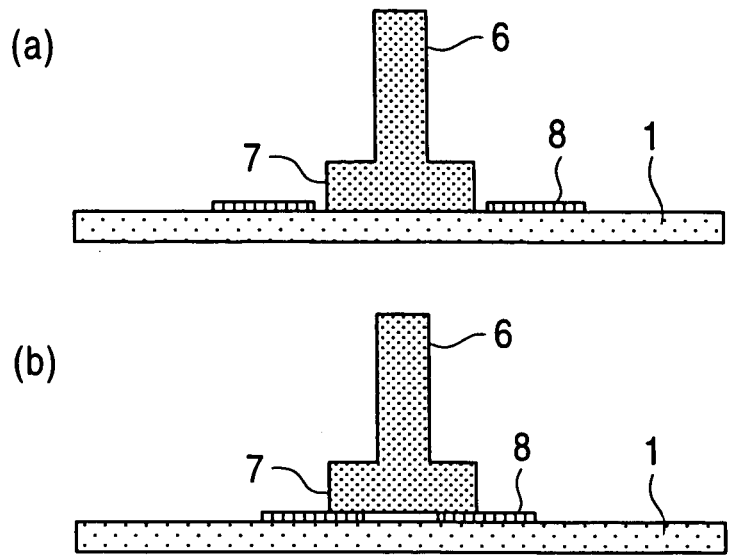
FIG. 1(*a*) is a stress sensor of the present invention in which resistor elements and a post are provided on one surface of a substrate 1, and in addition, (*b*) shows the state in which the bottom surface of a post overlaps the resistor elements.

Reference numerals in the figures indicate as follows, 1 . . . substrate, 2 . . . resistor element, 3 . . . resistor, 4 . . . trimming groove, 5 . . . conductor, 6 . . . post, 7 . . . outline of post bottom surface, 8 . . . strain gauge, 9 . . . terminal, 10 . . . dividing groove, 11 . . . large alumina substrate, 12 . . . post bottom portion, 13 . . . protection film, 15 . . . projecting portion, 16 . . . hole, 17 . . . through-hole, 18 . . . gap-forming member, 20 . . . substrate, 21 . . . trimming groove, 22 . . . resistor element, 23 . . . post operation unit, 24 . . . conductor, 30 . . . post, 30*b* . . . outline of post bottom surface, 31 . . . circuit board, and 32 . . . solder.

BEST MODE FOR CARRYING OUT THE INVENTION

Hereinafter, a first embodiment of the present invention will be described.

Figure 4:
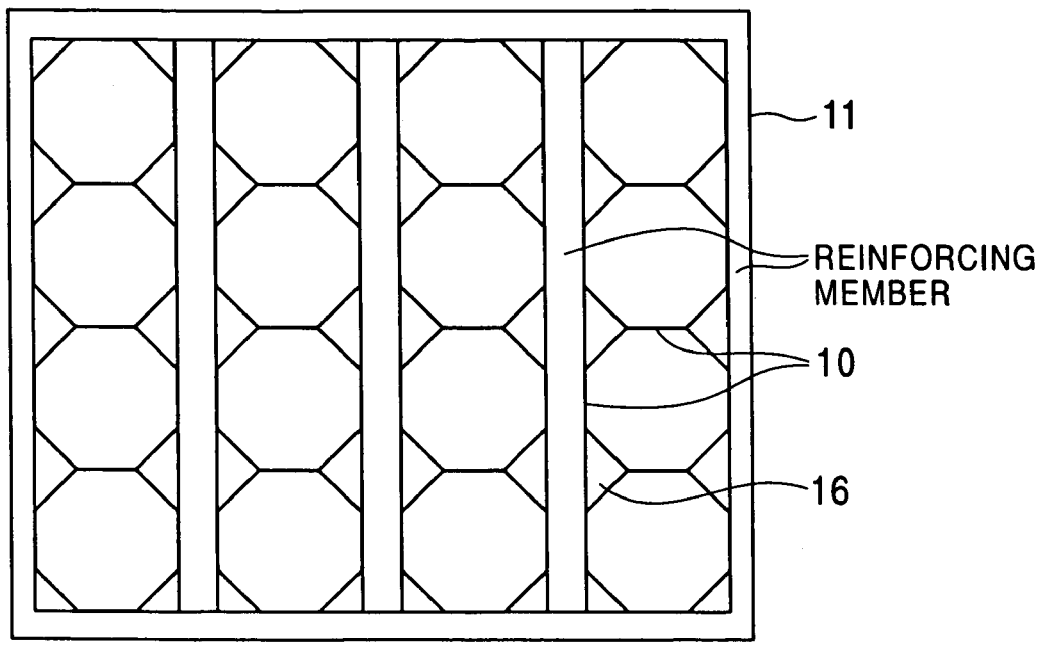
FIG. 4 is a front view of a large alumina substrate used for manufacturing the stress sensors of the present invention.

As shown in FIG. 4, a large alumina substrate 11 is prepared in which a plurality of units each having an octagonal outline is provided at positions defined by many dividing grooves 10 extending in longitudinal and lateral directions. The substrate described above is provided with reinforcing members. The reinforcing members are to be formed consequently by the layout of the dividing grooves 10 and holes 16, and, of course, have the same thickness as that of a substrate 1 for a stress sensor. This reinforcing member has a first function of preventing warping generated when a great number of the triangular holes 16 are formed by punching or the like in manufacturing the large alumina substrate 11. In addition, the reinforcing member has a second function of protecting a squeegee from being deformed and damaged when the squeegee is pressed onto a surface of the large alumina substrate 11 in screen printing described later, which is performed several times.

Figure 2:
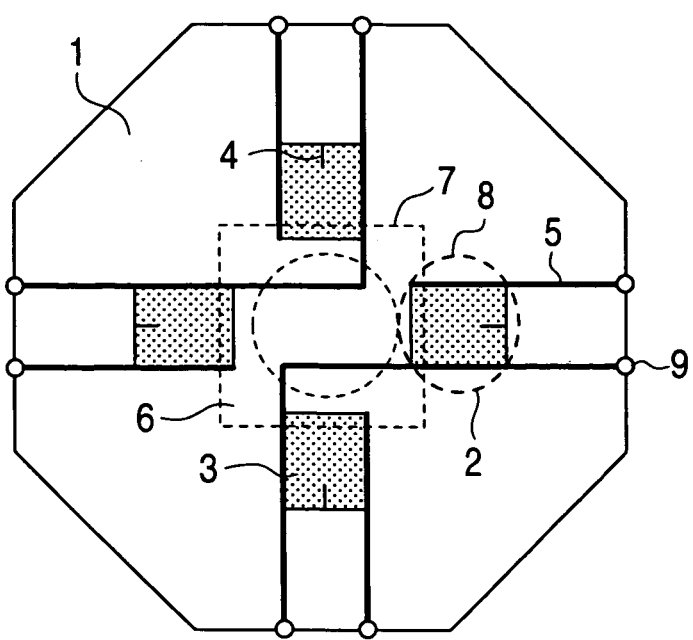
FIG. 2 is a schematic view showing the state in which strain gauges are disposed on a substrate forming the stress sensor of the present invention.

Onto the surface of the large alumina substrate 11, an Ag—Pd based conductive paste is applied by screen printing, and by firing, conductors 5 shown in FIG. 2 are obtained. Next, a ruthenium oxide-based resistor paste is applied by screen printing to form resistor elements 2 in combination with the conductors 5 shown in FIG. 2, and by firing, resistors 3 are formed.

Next, laser trimming is performed so that each of the four resistors 3 has a predetermined resistance, thereby forming trimming grooves 4. In this case, as shown in FIG. 2, the trimming grooves 4 are each formed in a resistor 3 portion at an end portion side of the substrate 1. When the trimming grooves 4 are each formed in the portion described above, a powdered conductor (in this case, a powder of a material forming the resistor 3) scattered in trimming is fixed around the individual end portions of the substrate 1 and the dividing grooves 10. Accordingly, the probability can be decreased as small as possible in that resistor elements 2 adjacent to each other on the same substrate 1 are connected to each other by the presence of the powder so that the function as the stress sensor cannot be fully obtained.

Subsequently, a silicone-based resin is further screen-printed so as to cover all the four resistor elements 2 including the resistors 3, thereby forming a protection film (not shown in the figure) through a curing step. In this step, the thickness of the protection film is set to 10 to 30 $\mu$m so as to protect the resistor elements 2 from plastic deformation resulting form an excessive application of a stress to the resistor elements 2 and to prevent an excessive decrease in sensitivity in response to the application of the stress to a post 6. In order to suppress the variation of the sensitivity described above as small as possible, the thickness of the protection film is preferably set to 15 to 20 $\mu$m. Accordingly, a mother substrate of the substrates 1 each having the layout of the resistor elements 2 shown in FIG. 2 is obtained.

As shown in FIG. 2, the post 6, formed of poly(vinyl terephthalate) (PVT) and having a square bottom surface, is fixed at approximately the center of the substrate 1 with an epoxy-based adhesive so that the bottom surface is brought into contact with the same surface as that of the substrate 1 on which the resistor elements 2 are disposed and overlaps the resistor 3 portions of the resistor elements 2. In this step, the overlapping areas are formed so as to be approximately equal to each other.

Next, a force is applied to the large alumina substrate 11 so as to open the dividing grooves 10 for separating (dividing) the individual stress sensors from each other, thereby obtaining the stress sensors of the present invention. In this case, the conductor 5 portions located at the outer ends of the substrate 1 serve as terminals 9 through which electrical signals are sent to and from a control unit. The stress sensor of the present invention thus obtained is a stress sensor comprising: resistor elements 2, current flow directions of which are substantially parallel to the respective sides of an outline 7 of the post bottom surface, are provided with the trimming grooves 4 formed in the side opposite to that facing the outline 7 of the post bottom surface and are disposed on two lines, being along a surface of the substrate 1 and perpendicularly intersecting each other at the center thereof, at substantially the same distance from the center of the substrate 1; and the post 6 bonded so that the center of the bottom surface thereof having a square outline coincides with the center of the substrate 1 and that the individual sides of the outline 7 of the post bottom surface face the respective resistor elements 2. In this stress sensor described above, the direction and magnitude of a stress applied to the post 6 can be grasped from variation in resistance of the resistor elements 2 caused by elongation or contraction thereof resulting from the application of the stress, and the post 6 bottom surface and the strain gauges 8 (resistor elements 2) overlap each other without the substrate 1 provided therebetween.

Figure 13:
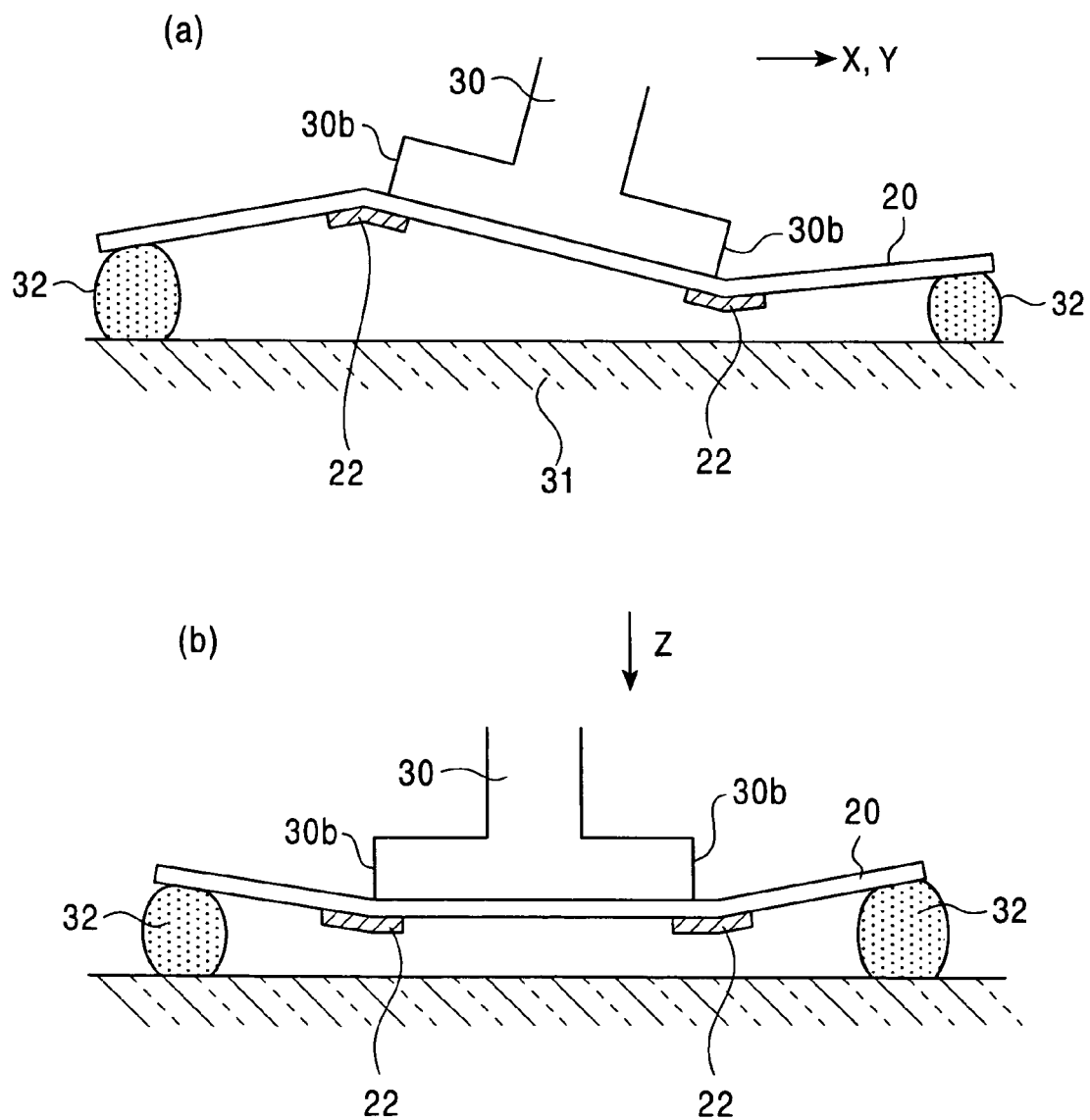
FIG. 13 includes views showing an example of a conventional stress sensor, in which the movement thereof is shown.
Figure 14:
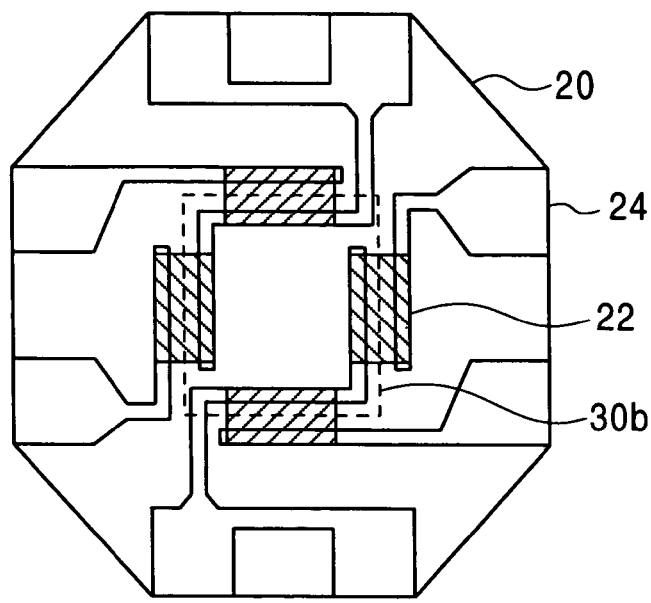
FIG. 14 includes views showing an example of the structure of a conventional stress sensor.
Figure 14:
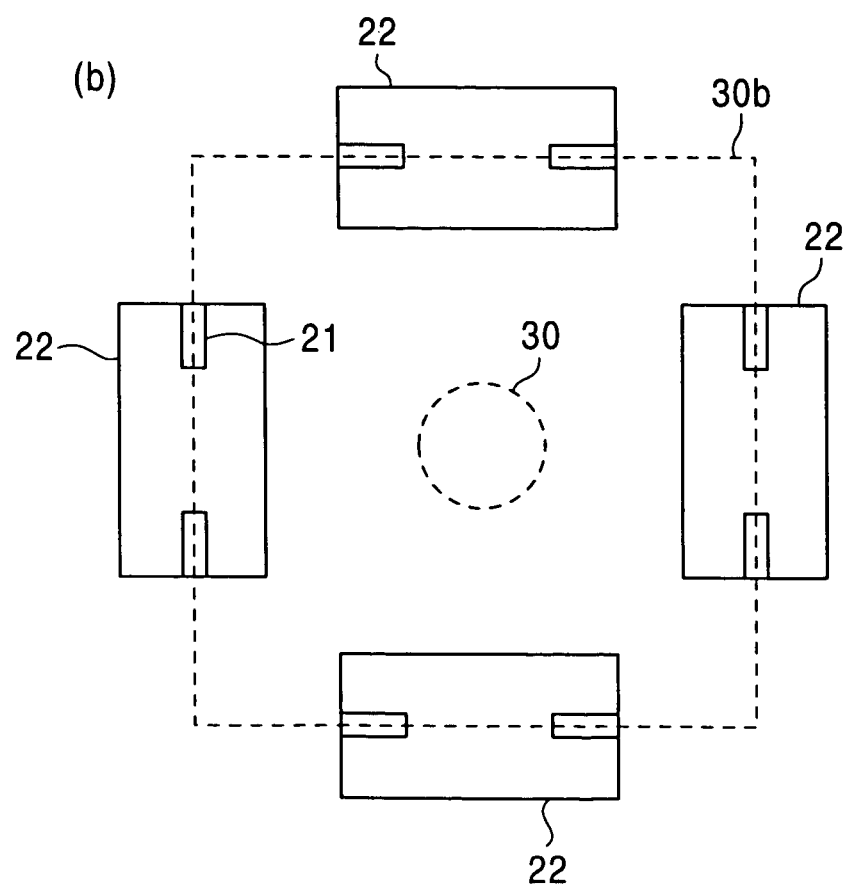

The opposite surface of the substrate 1, from that to which the post 6 is bonded, of the stress sensor thus obtained is mounted so as to face a printed circuit board. In this printed circuit board, wiring is provided for the control unit, for example, for detecting and computing electrical properties (variation in resistance) of the stress sensor and is electrically connected to the terminals 9 with solder. In this case, an epoxy resin adhesive is screen-printed on positions of the printed circuit board corresponding to the end portions of the substrate 1 of the stress sensor, and the stress sensor is placed on and fixed to the surface of the printed circuit board. Hence, the cured adhesive described above is disposed instead of solder 32 shown in FIG. 13, and as shown in the same figure, warping of the substrate 1 can be realized when the stress is applied to the post 6 in an optional direction of X, Y, and Z directions. In addition, this warpable region corresponds to the "sensor effective region" on the surface of the substrate 1 described above.

Figure 5:
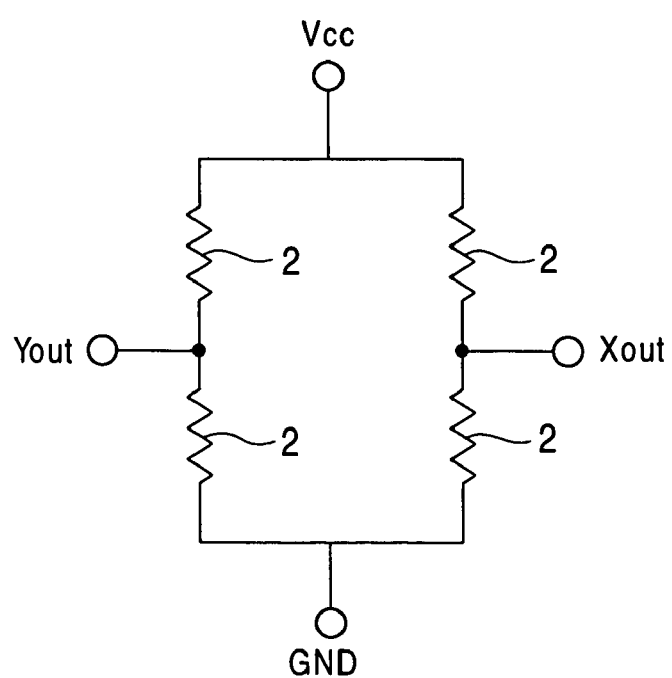
FIG. 5 is a view showing an example of a general input-output state of electrical signals when the stress sensor of the present invention is used.

FIG. 5 shows a general input-output state of electrical signals of the stress sensor according to the present invention. The four resistor elements 2 form a bridge circuit. Between voltage application terminals (Vcc)-(GND) of this bridge circuit, a predetermined voltage is applied. In addition, the resistor elements 2 and a Y terminal (Yout), provided at the left side in the figure, form a stress sensor in the Y axis direction, and in addition, the resistor elements 2 and an X terminal (Xout), provided at the right side in the figure, form a stress sensor in the X axis direction.

In the first embodiment, the step of fixing the posts 6 to the substrates 1 is performed before the large alumina substrate 11 is divided; however, the step described above may be performed after the division described above. However, after the individual substrates 1 are separated from each other, since the handling thereof becomes difficult, the step described above may cause problems in some cases. Accordingly, as is the first embodiment, the step of fixing the posts 6 to the substrates 1 is preferably performed before the large alumina substrate 11 is divided.

Hereinafter, a second embodiment of the present invention will be described.

Figure 6:
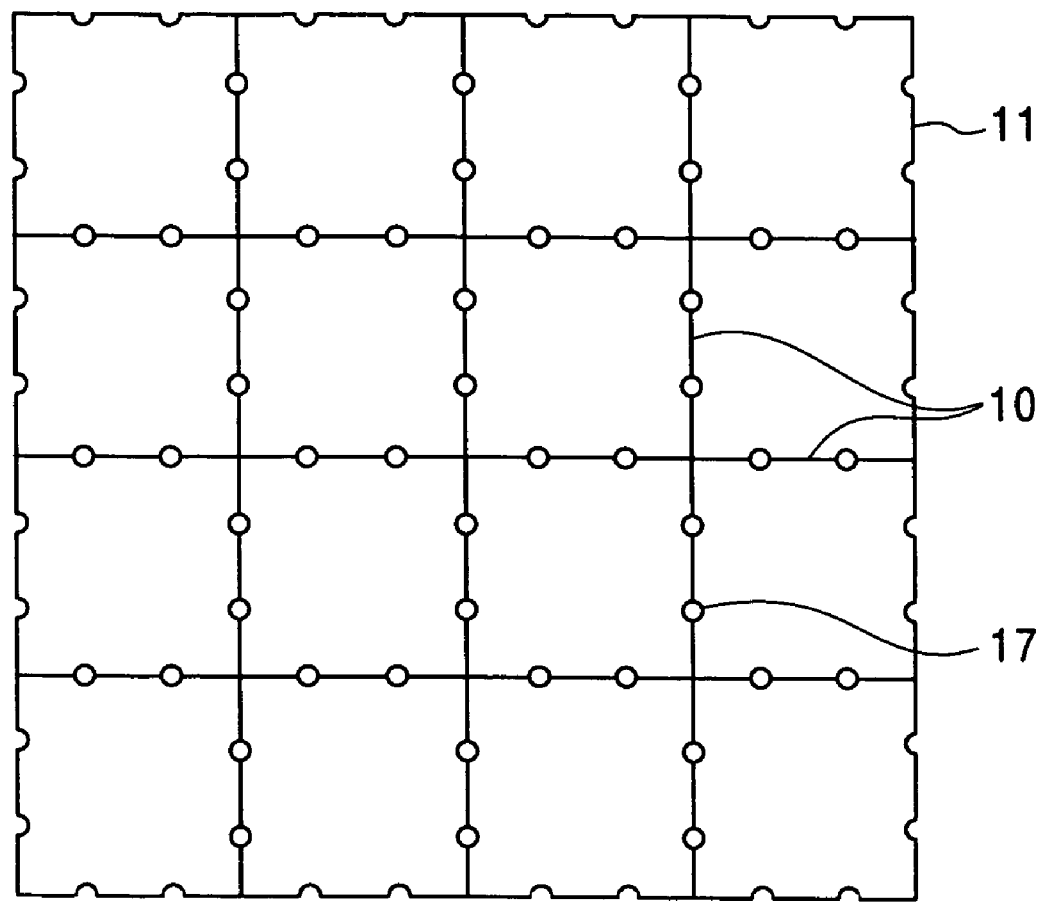
FIG. 6 is a front view showing a large alumina substrate used for manufacturing the stress sensors of the present invention.

As shown in FIG. 6, the large alumina substrate 11 is prepared, in which units having a square outline are each defined by the dividing grooves 10 extending in longitudinal and lateral directions and crossing a great number of thorough-holes 17.

Figure 7:
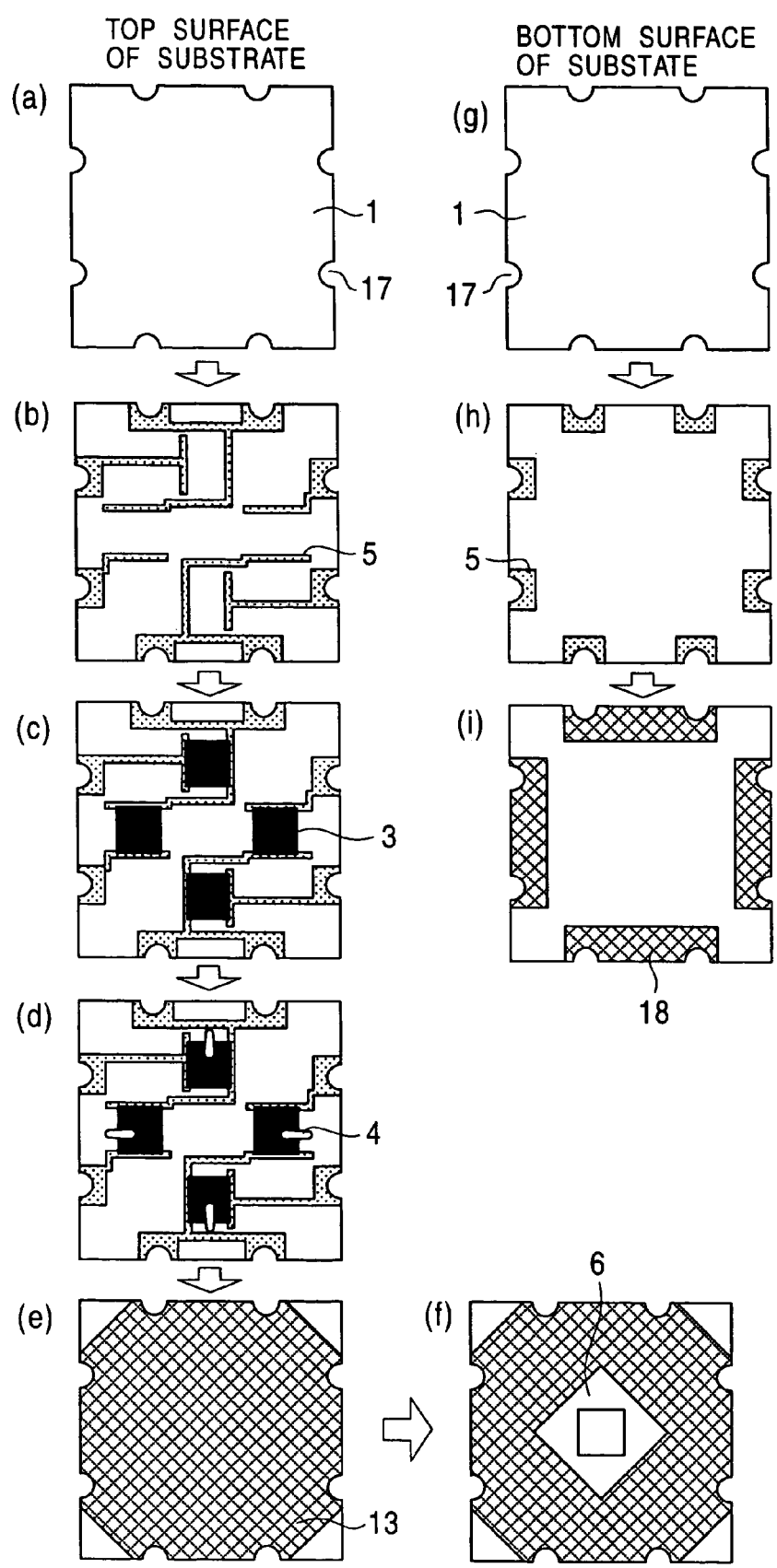
FIG. 7 includes views showing an example of a process for manufacturing the stress sensor of the present invention.
Figure 8:
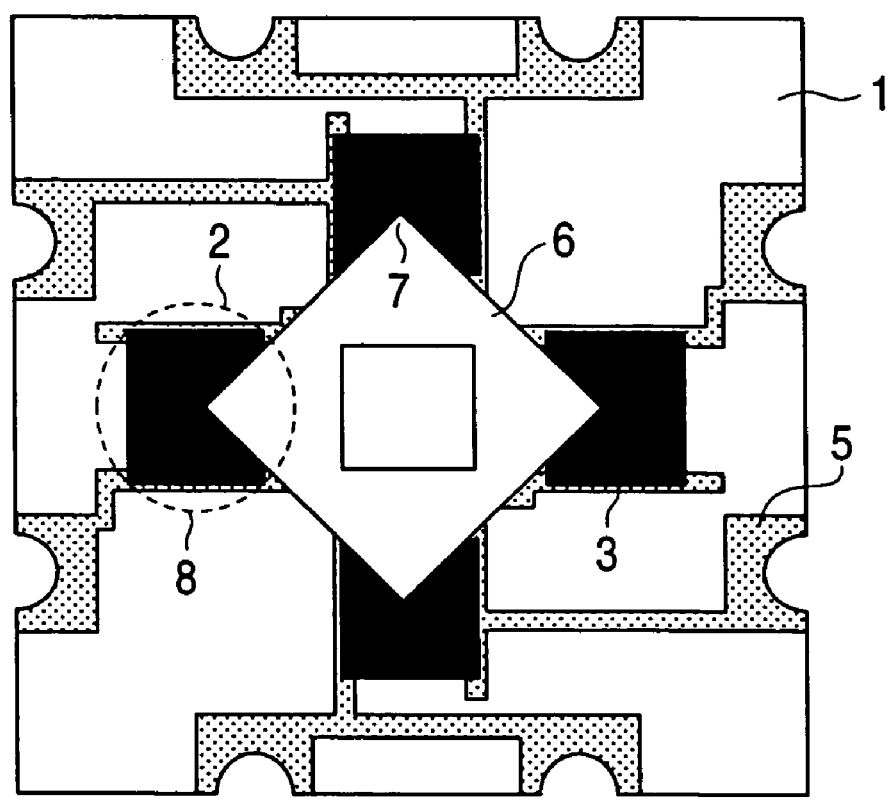
FIG. 8 includes views showing examples of a top view and a side view of an example of the stress sensor of the present invention.
Figure 8:
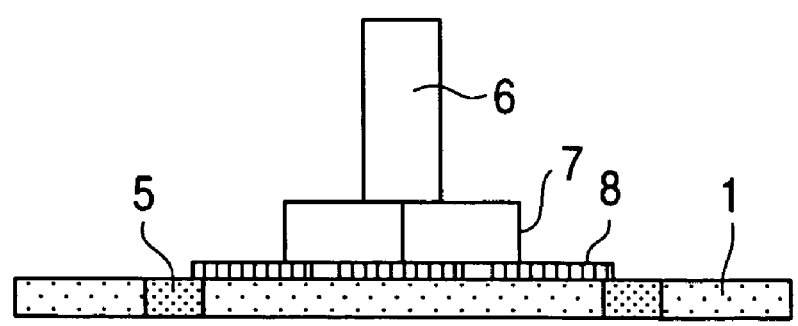

Onto each bottom surface shown in FIG. 7(g) of the substrates 1 of the large alumina substrate 11 surface, an Ag—Pd based conductive paste is first applied by screen printing, and by firing, the conductors 5 (FIG. 7(*h*)) are obtained. Next, an Ag—Pd based conductive paste is applied so as to form a pattern shown in FIG. 7(*b*), and by firing, the conductors 5 are obtained. The screen printing for forming the conductors 5 described above is performed by so-called through-hole printing, and as shown in a side view in FIG. 8, through the conductors 5 (terminal 9 described later) on the side walls of through-holes 17 formed at the side surfaces of the substrate 1, the conductors 5 on the top surface and the bottom surface of the substrate 1 are connected to each other.

Next, a ruthenium oxide-based resistor paste is screen-printed so as to form the resistor elements 2 in combination with the conductors 5 shown in FIG. 7, and by firing, the resistors 3 are obtained (FIG. 7(*c*)). Next, laser trimming is performed for individual four resistors 3 so as to have a predetermined resistance, thereby forming the trimming grooves 4 (FIG. 7(*d*)).

Subsequently, a silicone-based resin is further screen-printed so as to cover all the four resistor elements 2 including the resistors 3, and through a curing step, a protection film 13 is obtained (FIG. 7(*e*)). In this step, the thickness of the protection film is set to 10 to 30 $\mu$m. In order to suppress the variation in sensitivity of the resistor elements 2 to the stress applied to the post 6, it is preferable that the thickness of the protection film be uniform in the range of from approximately 15 to 20 $\mu$m. In this step, the positions of the conductors 5 and the resistors 3, which have been previously formed, can be grasped as concaves and convexes of the protection film 13 for improving the sensitivity to the stress applied to the Z direction described above. Accordingly, the effect of the grasping the relative positional relationship between the post 6 and the resistor elements 2, described above, is not lost. Furthermore, onto the bottom surface of the substrate 1, an epoxy resin paste is applied by screen printing so as to serve as a gap-forming member 18 (described later) having a thickness of approximately 50 $\mu$m (FIG. 7(*i*)).

In addition, as shown in FIG. 7(*f*), approximately to the center of each substrate 1, the post 6 having the square bottom surface, made of a molded poly(butylene terephthalate) (PBT) part, is fixed with an epoxy-based adhesive by using a known mounting device so that the bottom surface of the post 6 is brought into contact with the same surface of the substrate 1 as that on which the resistor elements 2 are disposed to overlap the resistor 3 portion of each of the resistor elements 2, and that projecting portions 15 (angular portions at the four corners of a post 6 bottom portion) are located to face the respective the resistor 3 regions in each of which a current pass is narrowed by the trimming groove 4 formed in the resistor 3. In this case, the overlapping areas are formed to be approximately equivalent to each other. According to this structure, the projecting portion 15 stimulates the resistor 3 region in which the current pass is narrowed. Hence, a mother substrate of the stress sensors of the present invention is obtained.

Next, a force is applied to the large alumina substrate 11 so as to open the dividing grooves 10 for separating (dividing) individual stress sensor units from each other, thereby obtaining the stress sensors of the present invention. The surface of the substrate 1, opposite to that to which the post 6 is bonded, of the stress sensor thus obtained is mounted so as to face a printed circuit board. In this printed circuit board, wiring is provided for the control unit, for example, for detecting and computing electrical properties (variation in resistance) of the stress sensor and is electrically connected to the stress sensor through the terminals and fixed thereto with solder. In this case, the gap-forming member 18 described above is used instead of the solder 32 shown in FIG. 7, and as shown in the same figure, warping of the substrate 1 can be realized when the stress is applied to the post 6 in an optional direction of X, Y, and Z directions. In addition, this warpable region corresponds to the "sensor effective region" on the surface of the substrate 1 described above. When this warpable region is shown in the figure, the area in which the protection film 13 is provided as shown in FIG. 7(*e*) is approximately corresponding thereto. The reason for this is believed that since the side wall surfaces of the through-holes 17 are fixed to the above-mentioned printed circuit board with solder through a reflow step or the like, the four corners of the substrate 1 may not serves as the warpable region. However, the center of the warpable region (the center of the sensor effective region) is a point at which the diagonal lines extending from the four corners of the substrate 1 perpendicularly intersect each other. The center of the post 6 bottom surface shown in FIG. 7(*f*) is disposed at a position that approximately coincides with the center of the warpable region.

The general input-output state of electrical signals of the stress sensor shown in FIG. 7 can be made equivalent to that shown in FIG. 5.

In the second embodiment, the step of fixing the posts 6 to the substrates 1 is performed before the large alumina substrate 11 is divided; however, the step described above may be performed after the division described above. However, after the individual substrates 1 are separated from each other, since the handling thereof becomes difficult, the step described above may cause problems in some cases. Accordingly, as is the second embodiment, the step of fixing the posts 6 to the substrates 1 is preferably performed before the large alumina substrate 11 is divided.

In the second embodiment, the substrate 1 having a square outline is used. The advantage thereof is easy manufacturing of the stress sensor. That is, when a large alumina substrate 11 containing a great number of octagonal substrates 1 is manufactured, a step must be performed beforehand of forming the relatively large holes 16 in a square shape or the like in the substrate described above by punching or the like. In addition, in the punching step described above or the screen printing in the second embodiment, the large alumina substrate 11 may be warped in some cases. As a result, subsequent handling of the substrate 1 or the properties of the stress sensor may be disadvantageously influenced in some cases. Accordingly, it has been believed that the substrate 1 having a square outline is suitably used.

Hereinafter, refereeing to FIG. 9, the structures of the trimming grooves 4, each formed in a resistor 3 region which is present only outside the outline 7 of the post bottom surface, obtained through the steps of the first or the second embodiment of the present invention will be described.

Figure 9:
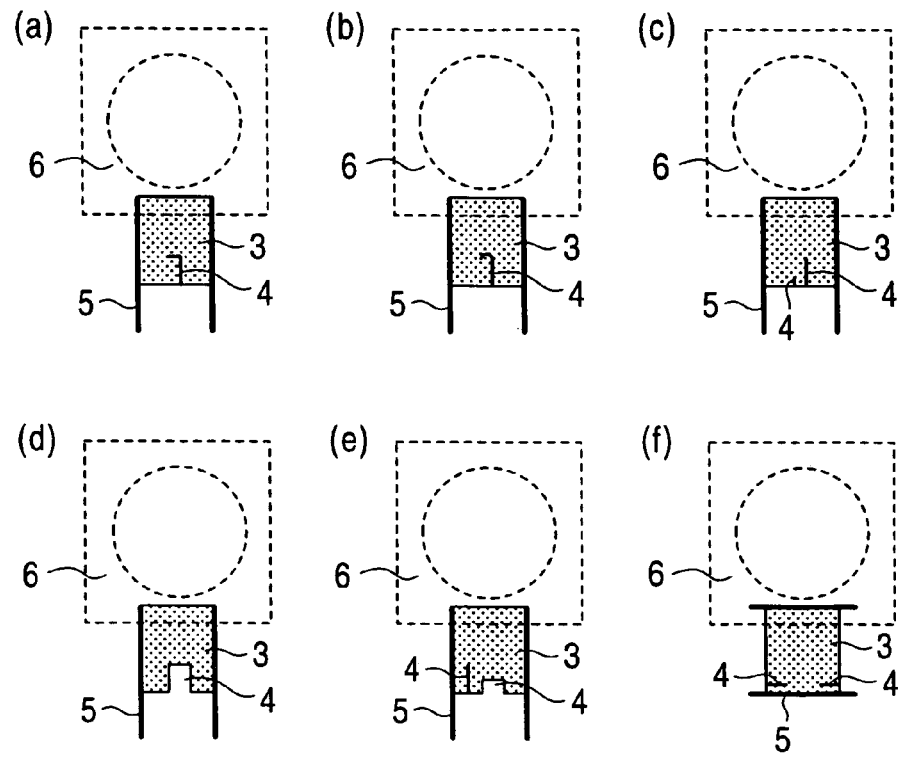
FIG. 9 includes views showing various shapes of trimming grooves which are optional constituent elements of the stress sensor of the present invention.

FIG. 9(*a*) shows the structure in which, in accordance with the positional relationship between the resistors 3 and the post 6 in FIG. 2, so-called L cut is used as a method for forming the trimming groove 4. This is also an example the structure in which the trimming groove 4 is primarily formed so as to be substantially parallel to the direction in which the resistor element 2 is elongated or contracted, and is subordinately formed so as to be substantially perpendicular to the direction described above. The trimming grooves 4 shown in FIG. 1 and the like each have a linear shape, and the trimming method therefor is called single cut. When the trimming groove 4 is formed form the outside of the resistor 3 by laser trimming or the like, a large residual stress may be generated in the position which is last irradiated with laser in some cases, resulting in the generation of cracks. In addition, the crack thus formed tends to extend along the direction in which the trimming groove 4 is formed. As a result, even if the crack as described above is generated, an effect of suppressing adverse influences caused by the generation of the crack as small as possible can be obtained by allowing the crack to extend in the direction approximately parallel to that in which current flows. Since the effect described above can be obtained, the L-cut is preferably selected as the trimming method.

FIG. 9(b) shows the structure in which, in accordance with the positional relationship between the resistors 3 and the post 6 in FIG. 2, the trimming groove 4 is formed by so-called hook cut. This is an example of the structure in which the trimming groove 4 is primarily formed so as to be substantially parallel to the direction in which the resistor element 2 is elongated or contracted, and is subordinately formed so as to be substantially in a direction except that parallel to the direction described above. The effect of this hook cut is approximately equivalent to that of the L cut described above.

FIG. 9(c) shows the structure in which, in accordance with the positional relationship between the resistors 3 and the post 6 in FIG. 2, a plurality of the trimming grooves 4 is formed by the single cut described above. In this trimming method described above, when a first trimming groove 4 is formed, very fast formation of the trimming groove 4 is performed until a predetermined value or a predetermined ratio is obtained with respect to a final desired resistance. Next, when a second trimming groove 4 is formed, slow formation of the trimming groove 4 is performed so as to obtain the final desired resistance. Since the speed for forming the second trimming groove 4 is slow, an effect of improving the resistance accuracy can be obtained. In addition, since the speed for forming the first trimming groove 4 is increased, it may be said that the effect of improving the resistance accuracy can be obtained without extremely increasing the total tome for the trimming operation.

FIG. 9(d) shows the structure in which, in accordance with the positional relationship between the resistors 3 and the post 6 in FIG. 2, the width of the trimming groove 4 is increased. As a method for forming the trimming groove 4 described above, for example, laser trimming may be mentioned, in which grooves for removing resistor (each corresponding to each of the trimming grooves 4 shown in FIGS. 9(a) to (c)) are formed, for example, so as to be approximately parallel to a current flow direction in the resistor 3 and be adjacent to each other in the width direction of the groove, and so that a material forming the resistor 3 does not substantially remain between the grooves for removing resistor formed adjacent to each other. By the method described above, a trimming groove 4 having a width equivalent to the length of the groove for removing resistor is formed. A very small amount of the material forming the resistor 3 may remain as long as being placed in a distribution state which causes no influence on the resistance of the resistor element 2. By using this trimming method, significantly superior resistance accuracy can be obtained. The reason for this is that the variation in resistance of the resistor element 2 per unit length of the groove for removing the resistor 3 can be extremely decreased. In addition, by the structure described above, the resistance after the trimming operation is stabilized. The reason for this is that the resistance tends to be stabilized with increase in width of the trimming groove 4. The stability of the resistance means the stability with respect to ambient environment such as an ambient temperature.

FIG. 9(e) shows the structure in which, in accordance with the positional relationship between the resistors 3 and the post 6 in FIG. 2, the second trimming groove 4 shown in FIG. 9(c) is replaced with the trimming groove 4 shown in FIG. 9(d). The method for forming the trimming groove 4 shown in FIG. 9(d) takes a long period of time; however, by the structure described above, without spending an extremely long period of time, a resistor element 2 having significantly superior resistance accuracy can be obtained.

FIG. 9(f) shows the structure in which the current flow direction in the resistor element 2 and the direction of the elongation and contraction thereof are parallel to each other, and in which the trimming grooves 4 are formed in the resistor 3 at the side opposite to that facing the outline 7 of the post bottom surface. The structure described above includes the case in which with respect to the half of the current flow length of the resistor 3, the trimming grooves 4 are formed at the side opposite to that facing the outline 7 of the post bottom surface. In the same figure, each groove is formed in each of the left and the right sides of the resistor 3. The reason for this is that when the trimming grooves 4 are formed at only one of the left and the right sides, the resistor element 2 at the side at which the trimming grooves 4 are formed exhibits the decrease in sensitivity to a stress. When the balance in sensitivity of the resistor element 2 is distorted, as described above, for example, inconvenience may occur in some cases, in which with respect to a stress applied to the post 6 in a specific direction, the result (information) of the stress application may have a slight deviation in terms of output direction. Accordingly, in applications in which very strict directional accuracy is required, this inconvenience may become a problem; however, for example, when the stress sensor is used as a pointing device of a computer, since it is believed that the very strict directional accuracy is not required, the stress sensor described above can be used without any problems. In addition, when the entire size of the resistor element 2 is decreased and the length of the trimming groove 4 may be extremely decreased, the distortion of the balance described above can be decreased to a level enough to be ignored, and the problems may not occur at all.

The structures shown in FIGS. 9(a) to (f) are the case in which the post 6 and the resistor elements 2 are disposed on the different surfaces of the substrate 1; however, in the case in which the post 6 and the resistor elements 2 are disposed at the same surface of the substrate 1 as shown in FIGS. 1(a) and (b), it is naturally understood that each of them is the first or the second embodiment of the present invention.

Figure 10:
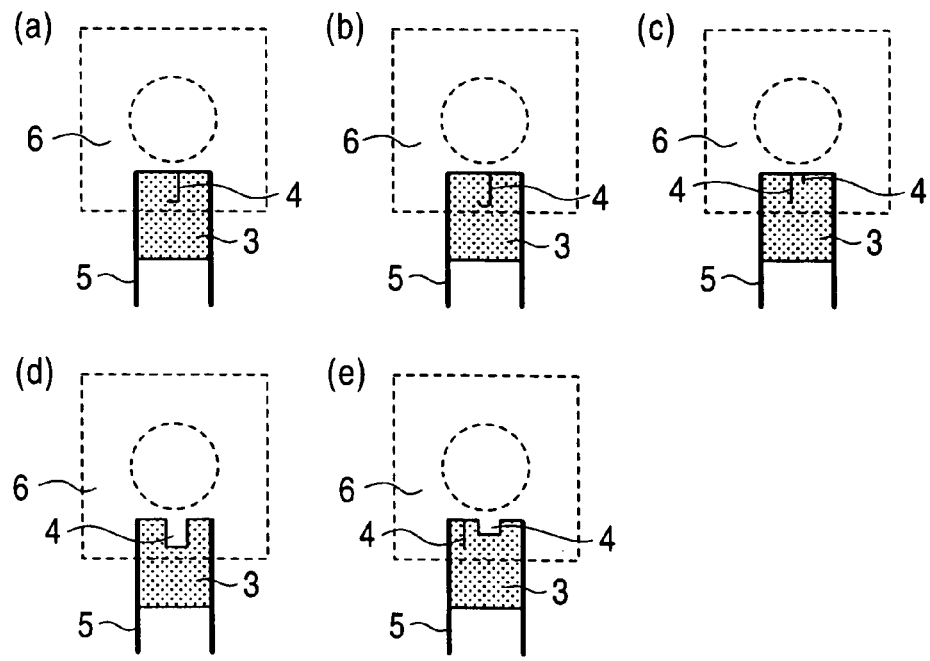
FIG. 10 includes views showing various shapes of trimming grooves which are optional constituent elements of the stress sensor of the present invention.

Hereinafter, refereeing to FIG. 10, the structures of the trimming grooves 4, each formed in a resistor 3 region which is present only inside the outline 7 of the post bottom surface, obtained through the steps of the first or the second embodiment of the present invention will be described.

Figure 3:
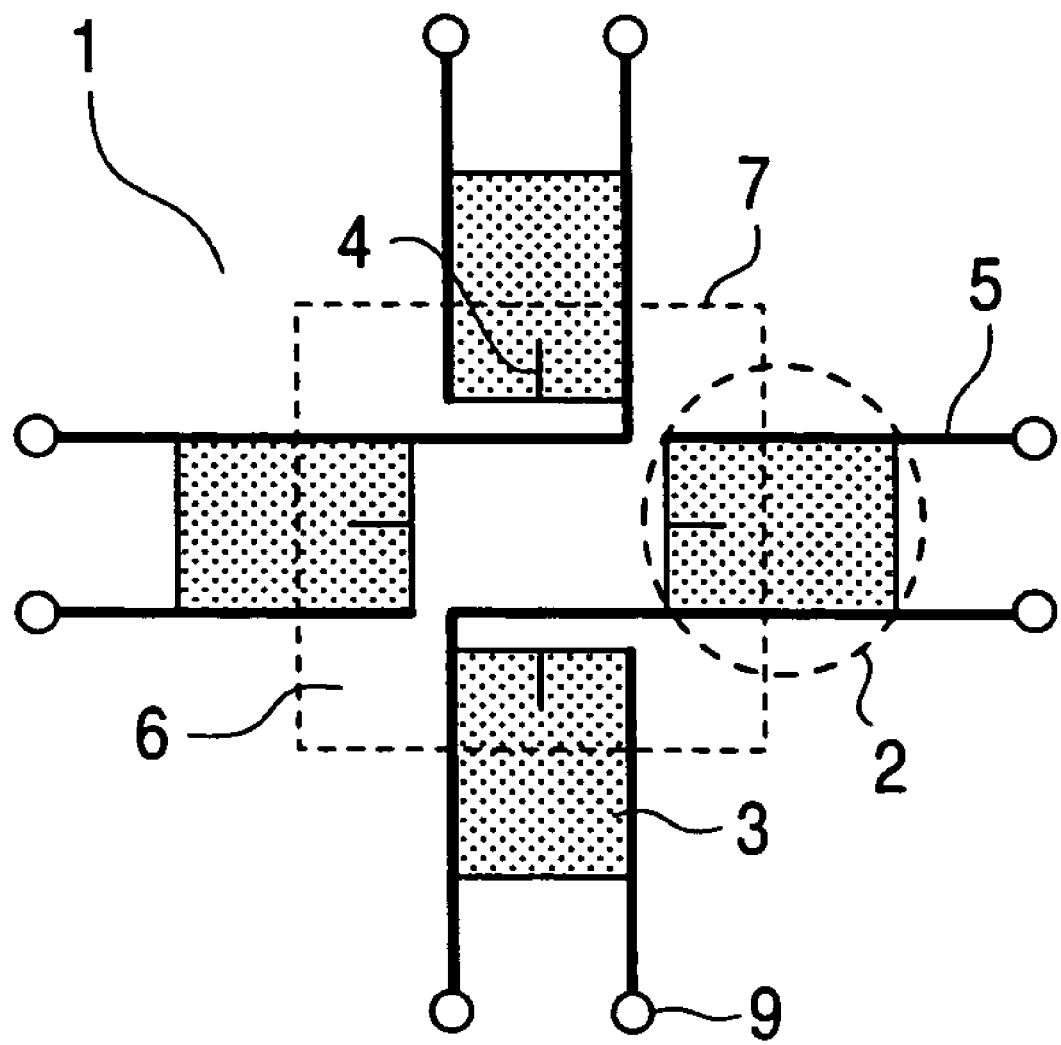
FIG. 3 is a view showing the arrangement of trimming grooves of resistor elements forming the stress sensor of the present invention.

FIG. 10(a) shows the structure in which, in accordance with the positional relationship between the resistors 3 and the post 6 in FIG. 3, the so-called L cut is used as a method for forming the trimming groove 4. The reason the L cut is selected is the same as described in FIG. 9(a). In the L-cut, since a groove following a first groove, which is perpendicular thereto, is generally short, and the substrate inside the outline 7 of the post bottom surface is very unlikely to be deformed (primarily, warping), the trimming groove is not substantially opened and closed by the stress applied to the post 6.

FIG. 10(b) shows the structure in which, in accordance with the positional relationship between the resistors 3 and the post 6 in FIG. 3, the trimming groove 4 is formed by so-called hook cut. This is an example of the structure in which the trimming groove 4 is primarily formed so as to be substantially parallel to the direction in which the resistor element 2 is elongated or contracted, and is subordinately formed so as to be substantially in a direction except that parallel to the direction described above. The hook cut described above has an effect approximately equivalent to that of the L cut described above.

FIG. 10(c) shows the structure in which, in accordance with the positional relationship between the resistors 3 and the post 6 in FIG. 3, a plurality of the trimming grooves 4 is formed by the single cut described above. By using the trimming method described above, the effect is obtained which improves the resistance accuracy without extremely increasing the total time for the trimming operation, and the reason for this is the same as that described in FIG. 9(c).

FIG. 10(d) shows the structure in which, in accordance with the positional relationship between the resistors 3 and the post 6 in FIG. 3, the width of the trimming groove 4 is increased. The reason the significantly superior resistance accuracy can be obtained by forming the trimming grooves 4 described above using the method for forming the trimming grooves 4 described above is equivalent to that described in FIG. 9(d).

FIG. 10(e) shows the structure in which, in accordance with the positional relationship between the resistors 3 and the post 6 in FIG. 3, the second trimming groove 4 shown in FIG. 10(c) is replaced with the trimming groove 4 shown in FIG. 10(d). The method for forming the trimming groove 4 shown in FIG. 10(d) takes a long period of time; however, by the structure described above, without spending an extremely long period of time, a resistor element 2 having significantly superior resistance accuracy can be obtained.

It is naturally understood that these structures shown in FIGS. 10(a) to (e) may be applied to the case in which the post 6 and the resistor elements 2 are disposed at the different surfaces of the substrate 1 and may also be applied to the case in which the post 6 and the resistor elements 2 are disposed on the same surface of the substrate 1 as shown in FIGS. 1(a) and (b).

Figure 11:
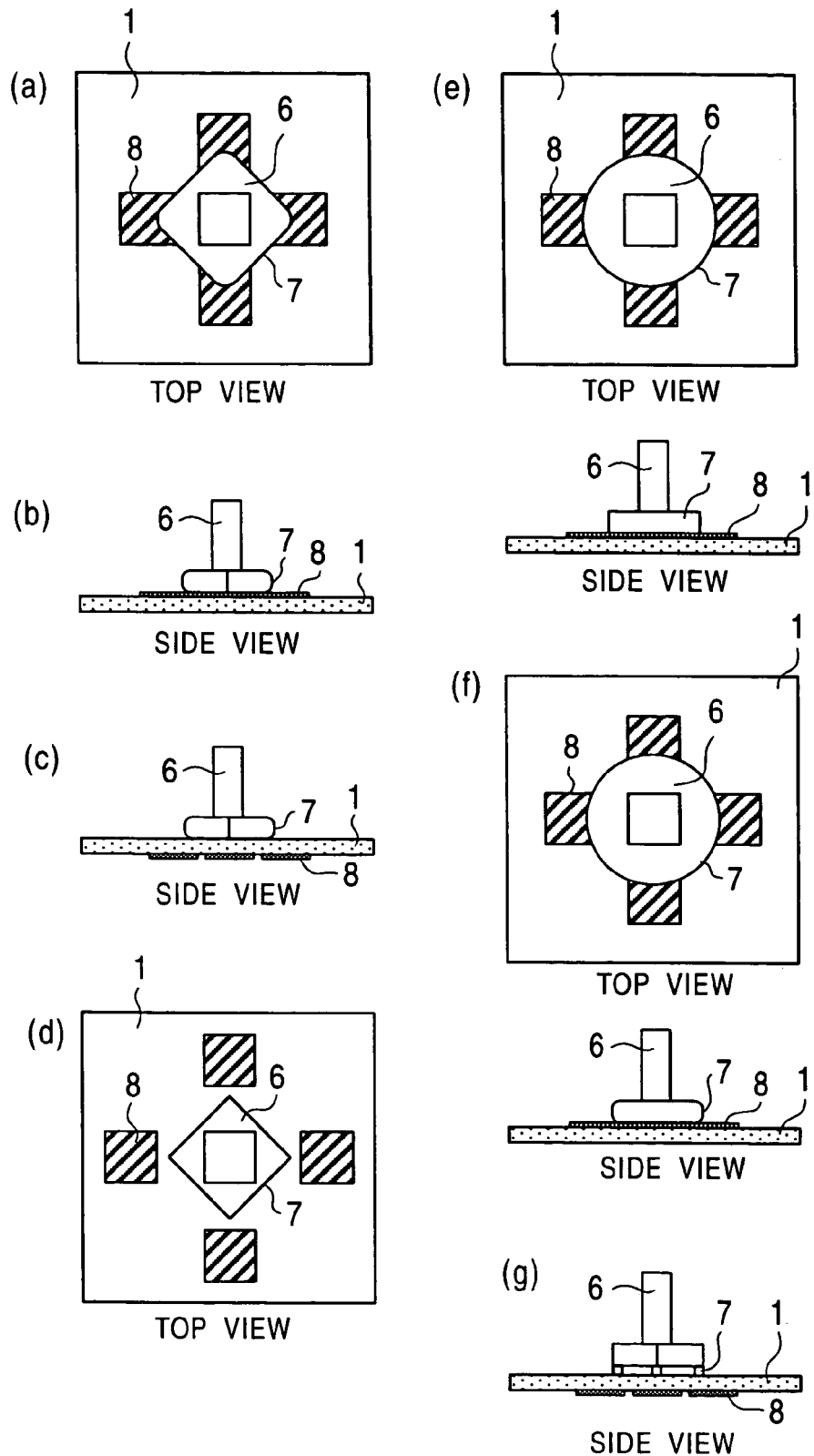
FIG. 11 includes views showing various shapes of post projecting portions which are optional constituent elements of the stress sensor of the present invention.

Hereinafter, with reference to FIG. 11, an example of a stress sensor formed through the steps of the first or the second embodiment of the present invention will be described, in which the post bottom portion 12 has the projecting portions 15, and the projecting portions 15 primarily stimulate the strain gauges 8. In FIG. 11, members necessary for descriptions are only shown, and the other members (for example, the conductors 5 shown in FIG. 10(a)) are omitted.

FIG. 11(a) shows an example in which the projecting portion 15 has a round shape when the stress sensor is viewed from above. In addition, FIG. 11(b) shows an example in which the projecting portion 15 has a round shape when the stress sensor is viewed from the side. It is naturally understood that the effect obtained when the projecting portions 15 is rounded described above can be achieved in both cases shown in FIG. 11(a) and FIG. 11(b). In addition, the structures described above may be used in combination. In addition, as shown in FIG. 11(c), the post 6 and the strain gauges 8 may be disposed on different surfaces of the substrate 1, and the top surfaces and/or the side surfaces of the projecting portions 15 may be rounded.

FIG. 11(d) shows the structure in which although the projecting portions 15 and the strain gauges 8 are provided so as to correspond to each other, they are provided at a certain distance from each other. The structure described above is expected to be effective, for example, when a material having very superior sensitivity (exhibiting a large variation in property even by a small elongation, contraction, or compression) is used for the strain gauges 8. This structure may be applied to both cases in which the post 6 and the strain gauges 8 are disposed on different surfaces of the substrate 1 and in which the post 6 and the strain gauges 8 are disposed on the same surface of the substrate 1.

FIG. 11(e) shows the structure in which the post bottom portion 12 is circular when viewed from above, and in which the post 6 bottom surface overlaps the strain gauges 8 without the substrate 1 provided therebetween. In this case, the entire periphery of the post bottom portion serves as the projecting portion 15. In the case in which the post 6 bottom surface overlaps the strain gauges 8 without the substrate 1 provided therebetween, the projecting portion 15 having the structure described above may be able to concentrate a stress applied to the post 6 thereon and to propagate it to the strain gauges 8 so as to obtain an effect in which an amount of elongation, contraction, or compression thereof is large as compared to that in the past. In a general stress sensor, when a stress is propagated to the strain gauges 8 from the post 6 bottom surface through the substrate 1, although the size of the post 6 bottom portion may have some influence, the projecting portion 15, which is the entire periphery of the post bottom portion, does not stimulate the strain gauges 8 with a highly concentrated stress. In this case, it is believed that a cylinder is preferably formed as the post 6 in which the top and the bottom portions thereof have the same diameter, since the post 6 is most easily manufactured.

FIG. 11(f) shows an example in which the projecting portion 15 shown in FIG. 11(e) has a round shape when the stress sensor is viewed from the side.

FIG. 11(g) shows an example of the case shown in FIG. 11(c), in which the projecting portions 15 are provided on the post 6 bottom surface. These projecting portions 15 may be formed when the post 6 is formed or may be subsequently formed by bonding an optional material (including a material different from that for the post) at optional positions of a smooth bottom surface of the post 6. This structure may also be applied when the post 6 and the strain gauges 8 are disposed on the same surface of the substrate 1.

Figure 12:
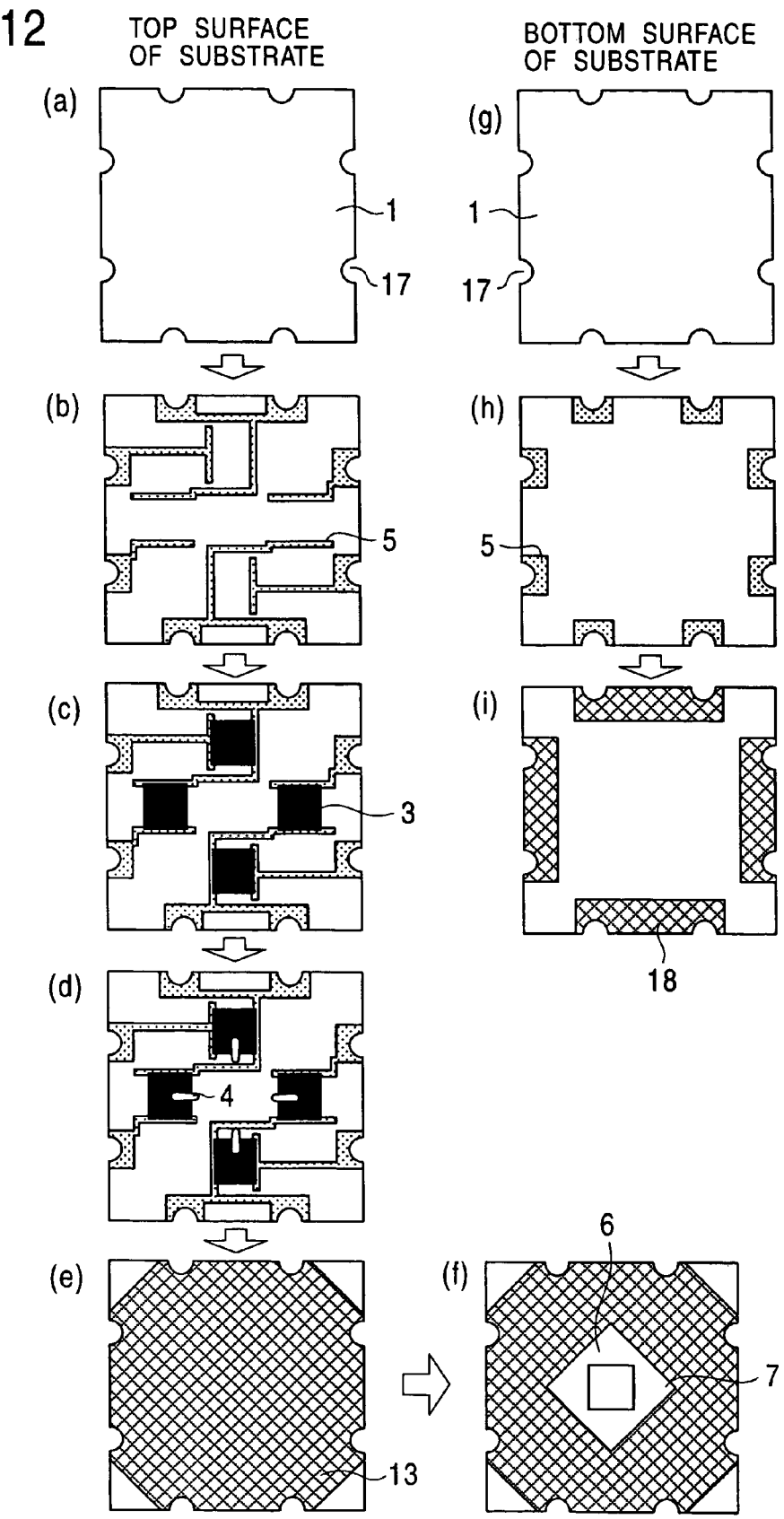
FIG. 12 includes views showing an example of a process for manufacturing the stress sensor of the present invention.

FIG. 12 includes views showing a process for manufacturing the stress sensor according to the second embodiment of the present invention in order to compare the process shown in FIG. 7, the stress sensor described above having the structure in which the trimming grooves 4 are formed only inside the outline 7 of the post bottom surface as shown in FIG. 3. The difference form FIG. 7 is only the positions of the trimming grooves 4 shown in FIG. 7(d) and FIG. 12(d).

In the stress sensor having the structure shown in FIG. 12, when a stress is applied to the post 6, the post 6 bottom surface presses the trimming grooves 4, and in view of this point described above, the stress sensor described above is different from that shown in FIG. 7.

Since the stress sensor shown in FIG. 12 has the projecting portion 15 at the four corners of the post bottom portion 12, a stress applied to the post 6 is propagated to the resistor 3 portion, which corresponds to the most outside end of the post bottom portion 12 and to the projecting portion 15, and presses the portion described above. The portion described above is a position in which the trimming groove 4 is not formed, and as a result, the trimming groove 4 is not primarily pressed, and the resistor 3 portion, in which a current pass thereof is narrowed by the trimming groove 4, is primarily pressed. As a result, the first object can be achieved.

In addition, by the stress application described above, damage of the resistors 3 in the vicinity of the trimming grooves 4, which is caused by an excessive stress applied thereto, is not generated, and the trimming grooves 4 are not also opened and closed, whereby the second object can also be achieved.

INDUSTRIAL APPLICABILITY

According to the present invention, a stress sensor having high sensitivity can be provided. In addition, in a stress sensor in which resistor elements composed of resistors provided with trimming grooves are used as strain gauges, in addition to the above, by suppressing plastic deformation of the resistors, a stress sensor capable of maintaining the accuracy of output resistance can be provided.

The stress sensor of the present invention can be suitably used for a pointing device for a personal computer, a multifunctional and multidirectional switch for various electronic apparatuses, and the like.

What is claimed is:

1. A stress sensor, for an electronic device, comprising:
a substrate having an upper surface;
a plurality of strain gauges, arranged on the upper surface of the substrate; and
a post having a shaft and a plate at an end of the shaft, said plate having a bottom surface mounted on the strain gauges such that an edge of the plate overlaps a portion of strain gauges, wherein a variation in property of strain gauges caused by an applied a directional stress and magnitude of a stress.

2. A stress sensor according to claim 1, wherein at least a projecting element is disposed on a bottom portion of the post for stimulating the strain gauges when a stress is applied to the post.

3. A stress sensor according to claim 1, wherein strain gauges comprise resistor elements and are disposed at four locations surrounding a center of a sensor effective region equidistant from the center of a sensor effective region on the surface the substrate, and the post is bonded or integrally formed with the substrate, wherein a center of a bottom surface of the post substantially coincides with the center of the substrate.

4. A stress sensor according to claim 1, wherein resistor elements are provided with a protection coating composed of a material softer than that of the substrate.

5. A stress sensor according to claim 1, wherein the substrate is composed of a resin-based material, a metal covered with a non-conductive material on the surface thereof, or a ceramic.

6. A stress sensor according to claim 1, wherein the post is composed of a metal, a ceramic, a resin, or a fiber-reinforced resin.

7. A stress sensor, for an electronic device, comprising:
a substrate;
a plurality of strain gauges, symmetrically arranged on a surface of the substrate; and
a post having a shaft and a plate at an end of the shaft, said plate having a bottom portion mounted on the strain gauges such that an edge of the plate substantially overlaps a portion of strain gauges, wherein a variation in property of strain gauges caused by an applied a directional stress and magnitude of a stress and removal thereof is obtained.

8. A stress sensor, for an electronic device, comprising:
a substrate;
a plurality of strain gauges, disposed on a surface of the substrate, wherein one of the strain gauges is disposed on a central area of the surface of the substrate; and
a post having a shaft and a plate at an end of the shaft, said plate having a bottom surface mounted on the strain gauge disposed on the central area of the substrate, wherein an edge of the plate overlaps a portion of the remaining strain gauges, and wherein a variation in property of strain gauges caused by an applied a directional stress and magnitude of a stress and removal thereof is obtained.

9. A stress sensor, for an electronic device, comprising:
a substrate;
a plurality of strain gauges, disposed on a first surface of the substrate, wherein one of the strain gauges is disposed on a central area of the first surface of the substrate; and
a post having a shaft and a plate at an end of the shaft, said plate having a bottom surface that is mounted on and completely overlaps the strain gauge disposed on the central area of the first surface of the substrate, and an edge of the plate overlaps a portion of the remaining strain gauges, and wherein a variation in property of strain gauges caused by an applied directional stress and magnitude of a stress and removal thereof is obtained.

10. A stress sensor, for an electronic device, comprising:
a substrate;
a post, attached to a first surface of the substrate; and
a plurality of resistor elements, each having a trimming groove, wherein the trimming groove is formed substantially parallel to the direction in which the resistor elements elongate or contract in response to a stimulation applied to the resistor elements.

11. A stress sensor according to claim 10, wherein the resistor regions are disposed where a current density is high compared to other areas over the substrate.

12. A stress sensor according to claim 10, wherein the resistor regions are disposed where a current passage is narrowed for adjusting resistance.

13. A stress sensor according to claim 10, wherein the trimming grooves are overlapped by the edge of the post or located in a location beyond the edge of a bottom surface of the post.

14. A stress sensor, for an electronic device, comprising:
a substrate;
a post having a shaft and a plate at an end of the shaft, said plate having a bottom surface mounted on a plurality of resistor elements, each having a trimming groove, wherein an edge of the plate overlaps a portion of the resistor elements.

15. A stress sensor according to claim 6, wherein the trimming grooves are formed substantially parallel to the direction in which the resistor elements elongate or contract of in response to a stimulation applied to the resistor elements.

16. A stress sensor, for an electronic device, comprising:
a substrate;
a post having a shaft and a plate at an end of the shaft, said plate having a bottom surface mounted on a plurality of strain gauges such that an edge of the plate overlaps a portion of strain gauges, wherein a variation in property of strain gauges caused by an applied directional stress and magnitude of a stress and removal thereof is obtained, wherein at least a projecting element is disposed on a bottom portion for stimulating the strain gauges when a stress is applied to the post.

17. A stress sensor according to claim 16, wherein the outer shape of a post bottom surface is a polygon, and individual angular portions of the polygon serve as the projecting portions.

18. A stress sensor according to claim 16, wherein the outer shape of a substrate is a polygon having at least one pair of sides which are parallel to each other, a top portion of the post is a polygonal having at least one pair of side surfaces which are parallel to each other.

19. A stress sensor according to claim 16, wherein the projecting portion has a rounded shape.

* * * * *